(12) United States Patent
Takeuchi et al.

(10) Patent No.: US 11,000,812 B2
(45) Date of Patent: May 11, 2021

(54) CARBON MEMBRANE FOR FLUID SEPARATION AND METHOD FOR MANUFACTURING THE SAME

(71) Applicant: Toray Industries, Inc., Tokyo (JP)

(72) Inventors: Kosaku Takeuchi, Otsu (JP); Dai Kondo, Otsu (JP); Takaaki Mihara, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/629,629

(22) PCT Filed: Jul. 20, 2018

(86) PCT No.: PCT/JP2018/027316
§ 371 (c)(1),
(2) Date: Jan. 9, 2020

(87) PCT Pub. No.: WO2019/021964
PCT Pub. Date: Jan. 31, 2019

(65) Prior Publication Data
US 2020/0171441 A1    Jun. 4, 2020

(30) Foreign Application Priority Data

Jul. 25, 2017  (JP) .............................. JP2017-143472
Jul. 25, 2017  (JP) .............................. JP2017-143473

(51) Int. Cl.
*B01D 71/02*   (2006.01)
*B01D 67/00*   (2006.01)
(Continued)

(52) U.S. Cl.
CPC ....... *B01D 71/021* (2013.01); *B01D 67/0067* (2013.01); *B01D 69/08* (2013.01);
(Continued)

(58) Field of Classification Search
CPC .... B01D 67/0067; B01D 69/08; B01D 69/10; B01D 69/12; B01D 71/02; B01D 71/021;
(Continued)

(56) References Cited

U.S. PATENT DOCUMENTS

| 4,917,835 A * | 4/1990 | Lear ........................ C04B 35/52 |
| | | 264/126 |
| 2013/0081991 A1 | 4/2013 | Ito et al. |

(Continued)

FOREIGN PATENT DOCUMENTS

| EP | 0474424 A2 | 3/1992 |
| ES | 2151781 A1 * | 1/2001 |

(Continued)

OTHER PUBLICATIONS

International Search Report and Written Opinion for International Application No. PCT/JP2018/027316, dated Sep. 11, 2018, 6 pages.
(Continued)

*Primary Examiner* — James C Goloboy
(74) *Attorney, Agent, or Firm* — RatnerPrestia

(57) ABSTRACT

The present invention provides a carbon membrane for fluid separation that can suppress the breakage of a carbon membrane installed in a separation module during a vacuum desorption step before permeation of a fluid or during permeation of a fluid. The present invention provides a carbon membrane for fluid separation including a porous carbon support and a dense carbon layer provided on the porous carbon support, wherein the porous carbon support has an $R_s$ value of 1.0 or less, where the $R_s$ value is an R value (peak intensity of D-band (1360 $cm^{-1}$)/peak intensity of G-band (1580 $cm^{-1}$)) calculated from a Raman spectrum.

14 Claims, 2 Drawing Sheets

(51) Int. Cl.
  *B01D 69/08* (2006.01)
  *B01D 69/10* (2006.01)
(52) U.S. Cl.
  CPC .......... *B01D 69/10* (2013.01); *B01D 2325/02* (2013.01); *B01D 2325/20* (2013.01)
(58) Field of Classification Search
  CPC ........... B01D 2323/02; B01D 2323/20; C01B 32/05; D01F 6/18; D01F 9/22; D06M 10/00; D06M 11/72
  See application file for complete search history.

(56) References Cited

U.S. PATENT DOCUMENTS

| | | | | |
|---|---|---|---|---|
| 2014/0335437 A1* | 11/2014 | Kim | .................... | H01M 4/9083 429/482 |
| 2015/0295250 A1* | 10/2015 | Nagami | ................ | H01M 4/926 429/524 |
| 2017/0216781 A1 | 8/2017 | Okabe et al. | | |

FOREIGN PATENT DOCUMENTS

| | | |
|---|---|---|
| JP | 03161030 A | 7/1991 |
| JP | 05220360 A | 8/1993 |
| JP | 2003138431 A | 5/2003 |
| JP | 2005138028 A | 6/2005 |
| JP | 2013063409 A | 4/2013 |
| JP | 2013543433 A | 12/2013 |
| JP | 2016041656 A | 3/2016 |
| JP | 2016047521 A | 4/2016 |
| WO | 2011148713 A1 | 12/2011 |

OTHER PUBLICATIONS

K. Kaneko et al., "The Micropore Swelling of Activated Carbon Fibers with Water Adsorption Studied by Use of in Situ Small Angle X-ray Scattering," Journal of Colloid and Interface Science, 127(1), Jan. 1989, pp. 298-299.

* cited by examiner

CARBON MEMBRANE FOR FLUID SEPARATION AND METHOD FOR MANUFACTURING THE SAME

CROSS REFERENCE TO RELATED APPLICATIONS

This is the U.S. National Phase application of PCT/JP2018/027316, filed Jul. 20, 2018, which claims priority to Japanese Patent Application No. 2017-143472, filed Jul. 25, 2017 and Japanese Patent Application No. 2017-143473, filed Jul. 25, 2017, the disclosures of each of these applications being incorporated herein by reference in their entireties for all purposes.

FIELD OF THE INVENTION

The present invention relates to a carbon membrane for fluid separation and a method for manufacturing the same.

BACKGROUND OF THE INVENTION

A membrane separation method is used as a technique for selectively separating a specific component from various mixed gases and mixed liquids for purification. The membrane separation method is attracting attention because this method is energy-saving as compared with other fluid separation methods. As for types of separation membranes, organic polymer membranes such as polyimide membranes and cellulose acetate membranes, and inorganic membranes such as zeolite membranes, silica membranes, and carbon membranes have been proposed.

Among them, carbon membranes exhibit excellent gas separation performance and pervaporation separation performance, and are usable even in environments where heat resistance and chemical resistance are required. Therefore, carbon membranes are expected to be put to practical use. As an example of the carbon membrane, there has been proposed a ceramic support type carbon membrane, which is obtained by laminating, on a surface of a ceramic porous support having a tube shape or a lotus root shape combining tubes and having a monolithic structure, a resin for a carbon membrane precursor such as a phenol resin or a polyimide, and carbonizing the resulting laminate in a non-oxidizing atmosphere. For example, it is disclosed that in a carbon membrane containing a phenol resin as a precursor, an R value calculated from a Raman spectrum within a specific range leads to an excellent water/ethanol separation factor (Patent Document 1).

There has also been proposed a carbon support type carbon membrane that is obtained by forming a tubular porous carbon support containing a phenol resin powder as a precursor, laminating a resin such as a phenol resin on a surface of the support, and then carbonizing the resulting laminate in a non-oxidizing atmosphere (Patent Document 2).

Meanwhile, a hollow fiber carbon membrane having a fiber diameter less than 1 mm may possibly be manufactured by a continuous process, and is expected to be manufactured at a lower cost than for the ceramic support type carbon membrane. As an example of the hollow fiber carbon membrane, there has been proposed a carbon membrane including a laminate of two membranes having different affinity with components to be passed through the membrane (Patent Document 3).

In general, hollow fiber carbon membranes are highly brittle, and it has been pointed out that hollow fiber carbon membranes may be broken due to vibration during manufacture or transportation of a separation module, or a sudden change of pressure or temperature during use. In order to suppress the breakage of the hollow fiber carbon membranes, studies have been made on improving the flexibility and elongation at break of the carbon membranes (Patent Document 4).

PRIOR ART DOCUMENTS

Patent Documents

Patent Document 1: International Publication No. 2011/148713
Patent Document 2: European Patent No. 0474424
Patent Document 3: Japanese Patent Laid-open Publication No. 2013-63409
Patent Document 4: Japanese Patent Laid-open Publication No. 5-220360

SUMMARY OF THE INVENTION

The present inventors produced hollow fiber carbon membranes for fluid separation from various carbon membrane precursors under various carbonization conditions, and evaluated the gas permeation performance of the hollow fiber carbon membranes. As a result, it was found that the hollow fiber carbon membrane in a separation module may be broken during the vacuum desorption step before the gas permeation measurement or during the gas permeation measurement, so that gas leakage may occur to impair the separation performance. Further, it was also found that the hollow fiber carbon membrane might be broken also during permeation of a gas containing water vapor or during permeation of water by a pervaporation method.

The present invention has been made in view of the above-mentioned problems, and an object of the present invention is to provide a carbon membrane for fluid separation that can suppress the breakage of a carbon membrane installed in a separation module during a vacuum desorption step before permeation of a fluid or during permeation of a fluid.

The present inventors studied the cause of breakage of the hollow fiber carbon membrane for fluid separation. As a result, they found that the hollow fiber carbon membrane may shrink in the course of desorption of water vapor adsorbed onto the carbon membrane and the support, or the hollow fiber carbon membrane may elongate in the course of adsorption of water vapor onto the carbon membrane and the support, as well as that these phenomena occur reversibly. More specifically, the present inventors presumed that the water vapor adsorption amount of the carbon membrane and the support may vary in various relative humidity atmospheres, and the carbon membrane may be broken due to the variation.

Although the cause of breakage of the fibrous carbon membrane during elongation of the membrane is not clear, the present inventors presumed as follows. That is, in a separation module densely packed with hollow fiber carbon membranes, when the hollow fiber carbon membranes elongate, the hollow fiber carbon membranes come into contact with each other to hinder the elongation of themselves, so that the hollow fiber carbon membranes may be broken.

The present inventors also presumed that also for film-like carbon membranes, when the carbon membranes elongate in a state where they are densely packed in a spiral type separation module, the carbon membranes may be broken because the membranes are distorted and the stress is concentrated at a specific portion.

In view of the above-mentioned problems, the present inventors studied, in the track of the example described in Patent Document 4, to shorten the carbonization time to improve the elongation at break. As a result, although the number of hollow fiber carbon membranes broken was reduced, it was impossible to sufficiently suppress the breakage. The present inventors presumed that this result is due to insufficient carbonization of the support portion that resulted in high hydrophilicity of the support and a large amount of water vapor adsorbed onto the support. Therefore, they concluded that it is insufficient to merely improve the elongation at break of the carbon membrane for fluid separation in order to sufficiently suppress the breakage of the carbon membrane in the separation module, and that the dimensional stability of the support of the carbon membrane for fluid separation should be improved under various conditions of temperature and atmosphere.

Further, as a result of intensive studies, the present inventors found that in a carbon membrane for fluid separation including a porous carbon support and a dense carbon layer provided on the porous carbon support, use of a porous carbon support having a high carbonization degree, that is, an R value ($R_s$ value) calculated from a Raman spectrum of the porous carbon support of 1.0 or less, reduces the dimensional change rate of the carbon membrane for fluid separation in various relative humidity atmospheres, and can suppress the breakage of the carbon membrane for fluid separation.

More specifically, an embodiment of the present invention for solving the above-mentioned problems is a carbon membrane for fluid separation including a porous carbon support and a dense carbon layer provided on the porous carbon support, wherein the porous carbon support has an $R_s$ value of 1.0 or less, where the $R_s$ value is an R value (peak intensity of D-band (1360 cm$^{-1}$)/peak intensity of G-band (1580 cm$^{-1}$)) calculated from a Raman spectrum.

According to the present invention, it is possible to suppress the breakage of the carbon membrane for fluid separation in a fluid separation module during a vacuum desorption step before permeation of a fluid or during permeation of a fluid. Therefore, fluid leakage is suppressed, and a carbon membrane for fluid separation having a high separation factor can be provided.

DETAILED DESCRIPTION OF EMBODIMENTS OF THE INVENTION

<Carbon Membrane for Fluid Separation>

Figure 1:
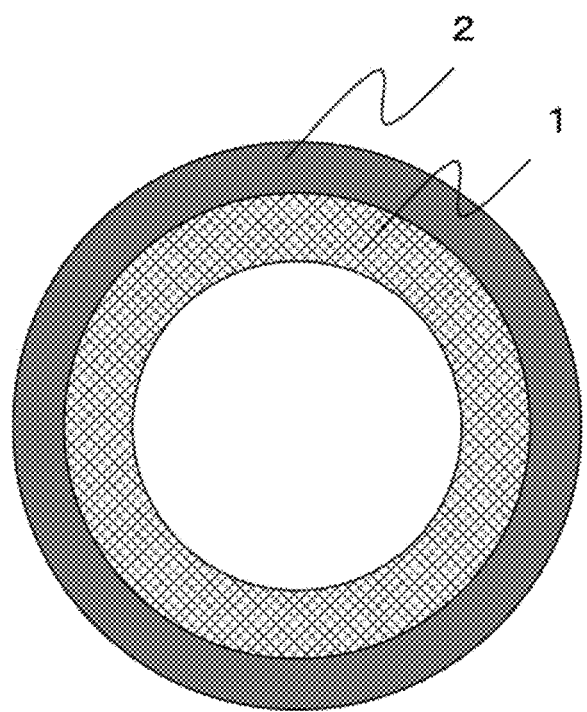
FIG. 1 is a schematic cross-sectional view of a carbon membrane for fluid separation according to one embodiment of the present invention.

As shown in FIG. 1, the carbon membrane for fluid separation according to an embodiment of the present invention has a structure including a porous carbon support 1 and a dense carbon layer 2 provided on the porous carbon support 1. Although FIG. 1 shows a form of a hollow fiber carbon membrane as an example, the present invention is not limited thereto, and a solid fiber or a film may also be employed.

[Porous Carbon Support]

The porous carbon support is a base material for maintaining the shape of the dense carbon layer that serves as a separation membrane. Since the support is made from a carbon material, it has higher heat resistance and chemical resistance than a support made from an organic polymer does. In addition, since the support has a porous structure, it also serves as a flow path for fluids such as gases and liquids. The porous structure is not limited, and various porous structures such as a closed cell structure and a continuous porous structure can be employed. When the support has a closed cell structure, the compressive strength in a cross-sectional direction is high. On the other hand, when the support has a continuous porous structure, the pressure loss during permeation of a fluid is small, and the permeation rate of a fluid is high.

Figure 2:
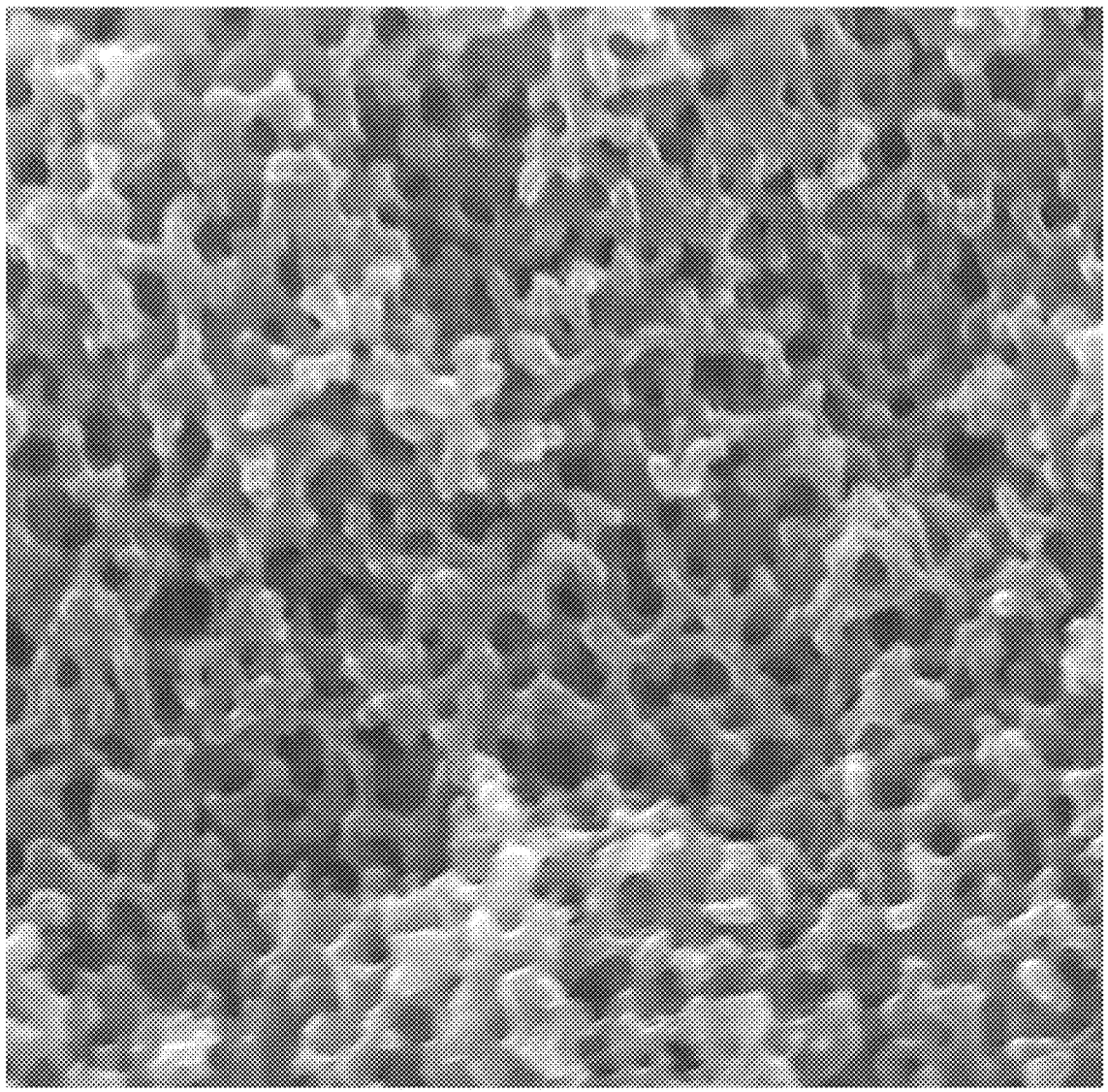
FIG. 2 is a scanning electron micrograph of a porous carbon support.

The porous structure of the porous carbon support is preferably a co-continuous porous structure that is one form of the continuous porous structure. The co-continuous porous structure is a structure in which branches (carbon parts) and pores (voids) are separately regularly intertwined three dimensionally while being continuous. Specifically, as illustrated in FIG. 2, the co-continuous porous structure is observed by cutting a specimen that has been sufficiently cooled in liquid nitrogen with tweezers or the like to produce a cross section, and viewing the cross-sectional surface with a scanning electron microscope, and means a structure in which branches and voids are separately continuous in the depth direction. Such a structure of the porous carbon support produces an effect that the branches support one another to maintain the structure, and the stress is distributed throughout the support. Therefore, the compressive strength in a cross-sectional direction is high, and the carbon membrane for fluid separation can be used without being damaged even if the supplied fluid has a high pressure.

The porous structure of the porous carbon support is preferably a highly uniform structure having a periodic structure, and the porous structure preferably has a structural period of 0.002 µm or more and 10 µm or less. When the structural period is 0.002 µm or more, the pressure loss during the passage of a fluid through the voids is small, and the permeation rate of a fluid is high. The structural period is more preferably 0.01 µm or more, still more preferably 0.05 µm or more. On the other hand, when the structural period is 10 µm or less, the compressive strength in a cross-sectional direction is high. The structural period is more preferably 8 µm or less.

The structural period of the porous structure is calculated from the value of scattering angle 2θ according to a formula shown below. The scattering angle 2θ corresponds to the position of a peak top of scattered-light intensity that is obtained by irradiating the carbon membrane for fluid separation according to an embodiment of the present invention with X-rays, and performing small-angle scattering.

$P = \lambda / 2 \sin \theta$

P: structural period (µm), λ: wavelength of incident X-rays (µm)

When the structural period of the porous carbon support is too large to observe small-angle scattering, the structural period is obtained by X-ray computed tomography (X-ray CT). Specifically, a three-dimensional image captured by X-ray CT is subjected to Fourier transform to produce a two-dimensional spectrum, and the two-dimensional spectrum is processed by circular averaging to produce a one-dimensional spectrum. The characteristic wavelength corresponding to the position of a peak top in the one-dimensional spectrum is determined, and the structural period of the porous carbon support is calculated from the inverse of the wavelength.

The analysis of the structural period is not affected by the dense carbon layer because the small-angle scattering is hardly observed in the dense carbon layer. Therefore, the structural period of the porous carbon support is identical to the value of the structural period calculated by measuring the entire carbon membrane for fluid separation.

Further, when the porous structure is highly uniform, the origin of breakage of the carbon membrane for fluid separation is less likely to be produced, and the effect of distributing the stress due to compression or the like throughout the carbon membrane is improved, so that the compressive strength in a cross-sectional direction is high. In addition, the carbon membrane for fluid separation can have improved flexibility and reduced bend radius. The uniformity of the porous structure is evaluated based on the half-value width of a peak of scattered-light intensity that is obtained by irradiating the carbon membrane for fluid separation according to an embodiment of the present invention with X-rays. Specifically, in a graph in which the scattering angle 2θ is plotted as abscissa and the scattered-light intensity is plotted as ordinate, it is meant that the smaller the half-value width of a peak of scattered-light intensity is, the higher the uniformity is. The half-value width of a peak is preferably 5° or less, more preferably 1° or less, still more preferably 0.1° or less.

The term "half-value width of a peak" means the width determined in the following manner. Specifically, the vertex of the peak is named point A, and a straight line parallel to the ordinate of the graph is drawn from point A. The intersection of the straight line and the baseline of the spectrum is named point B, and the width of the peak as measured at the center (point C) of the segment that connects point A and point B is defined as the half-value width. The term "width of the peak" herein means the width thereof as measured along a straight line that is parallel to the baseline and passes through point C.

The porous structure of the porous carbon support preferably has an average porosity of 10% or more and 80% or less. The "average porosity" means a value calculated in the following manner. Specifically, a precise cross section of an embedded specimen of a porous carbon support is formed by the cross-section polisher method (CP method), the cross section is observed at a magnification of 1±0.1 (nm/pixel) and at a resolution of 700,000 pixels or higher, and an examination region required for calculation in which each side has 512 pixels is set in the resulting image. Then, the porosity is calculated by a formula shown below, where A is the cross-sectional area of the examination region, and B is the total area of the pores. The average porosity is a value calculated as an arithmetic average of twenty arbitrary portions in the cross section. When the carbon membrane for fluid separation is a hollow fiber, the hollow portion is not included in the average porosity.

Average porosity (%)=$B/A$×100

The higher the average porosity is, the smaller the pressure loss as a fluid flow path is, and the higher the permeation rate of a fluid is. Therefore, the average porosity is more preferably 15% or more, still more preferably 18% or more. On the other hand, the lower the average porosity is, the higher the compressive strength in a cross-sectional direction is, and a fluid can pass through the carbon membrane for fluid separation under high-pressure conditions.

Therefore, the average porosity is more preferably 75% or less, still more preferably 70% or less.

Further, when the porous carbon support has a large average pore diameter, the pressure loss is small, and the permeation rate of a fluid is high. Therefore, the average pore diameter is preferably 30 nm or more, more preferably 50 nm or more. On the other hand, when the porous carbon support has a small average pore diameter, the compressive strength in a cross-sectional direction is high. Therefore, the average pore diameter is preferably 3,000 nm or less, more preferably 2,500 nm or less.

As for the average pore diameter of the porous carbon support, a value obtained by analyzing the carbon membrane for fluid separation by the mercury intrusion method is used. In the mercury intrusion method, first, a pressure is applied to the carbon membrane for fluid separation so that mercury is infiltrated into pores of the porous carbon support, and the pore volume and the specific surface area of the pores are determined from the pressure and the amount of mercury intruded in the pores. Then, from the relationship between the pore volume and the specific surface area, the pore radius or diameter is calculated assuming that the pores are cylindrical. In the mercury intrusion method, a pore diameter distribution curve of 5 nm or more and several 100 μm or less can be obtained, and the peak top pore diameter is defined as the average pore diameter of the porous carbon support. Since the dense carbon layer does not have pores of 5 nm or more, the average pore diameter of the carbon membrane for fluid separation is substantially identical to the average pore diameter of the porous carbon support.

In the present invention, the porous carbon support preferably has a fiber or film form. A "fiber" is an object having a ratio of the fiber length L to the average fiber diameter D (aspect ratio L/D) of 100 or more. It is possible to employ a hollow fiber having voids (hollow portions) that are continuously formed in a fiber axis direction (longitudinal direction) and that have a substantially identical diameter, or a fiber that does not have any hollow portion, that is, a solid fiber. When the porous carbon support is made of fibers, a compact separation module is obtained because the membrane area per unit volume of the separation module is larger than that in the case of a film. Even if the porous carbon support has a solid fiber form, the porous carbon support has a porous structure.

When the porous carbon support is made of fibers, the average diameter of the fibers can be arbitrarily determined. When the average diameter is large, a pressure loss between the upstream side and the downstream side (permeation side) of the membrane hardly occurs, and it is easy to secure a differential pressure necessary for permeation of a fluid. Therefore, the average diameter of the fibers is preferably 50 μm or more. On the other hand, when the average diameter of the fibers is small, the flexural rigidity is improved, and the membrane area per unit volume in the separation module is large. Therefore, the average diameter is preferably 500 μm or less. The cross-sectional shape of the fiber is arbitrary, and examples include a round cross section, multi-lobe cross sections such as a triangle cross section, a flat cross section, and a hollow cross section. A round cross section is preferable because the compressive strength in a cross-sectional direction is high.

When the porous carbon support is a hollow fiber, the area ratio of the cross-sectional area C of the hollow portion to the cross-sectional area A of the porous carbon support, that is, the hollow area ratio C/A, is preferably 0.001 or more and 0.7 or less. Herein, the cross-sectional area A includes the cross-sectional area C of the hollow portion. The higher the hollow area ratio is, the smaller the pressure loss is, and the higher the fluid permeation rate is. Therefore, the hollow area ratio is more preferably 0.01 or more, still more preferably 0.05 or more. On the other hand, the lower the hollow area ratio is, the higher the compressive strength in a cross-sectional direction is. Therefore, the hollow area ratio is more preferably 0.6 or less. When the porous carbon support of an embodiment of the present invention has a co-continuous porous structure, the pressure loss during passage of a fluid through the porous structure portion is small even if the hollow area ratio is reduced to increase the compressive strength in a cross-sectional direction, and thus the permeation rate of a fluid is hardly decreased. The porous carbon support may have a plurality of hollow portions in order to achieve both the compressive strength in a cross-sectional direction and the permeation rate of a fluid. In this case, the total of cross-sectional areas of the hollow portions is regarded as the cross-sectional area C of the hollow portions.

Meanwhile, when the porous carbon support is a film, the thickness of the porous carbon support is not limited. A large thickness of the porous carbon support improves the handleability. Therefore, the thickness is preferably 0.01 μm or more. Alternatively, a small thickness of the porous carbon support improves the flexural rigidity, and the carbon membrane for fluid separation is hardly broken. Therefore, the thickness is preferably 5,000 μm or less.

The porous carbon support of the present invention preferably has an R value (peak intensity of D-band (1360 $cm^{-1}$)/peak intensity of G-band (1580 $cm^{-1}$)) calculated from a Raman spectrum, that is, an $R_s$ value of 1.0 or less.

In the measurement of a carbon material by Raman spectroscopy, the G-band shows a peak derived from a graphite structure, and the D-band shows a peak derived from a disorder of the crystal structure. In general, the R value is a parameter used for evaluating the crystallinity and carbonization degree (graphitization degree) of a carbon material, and a smaller R value means a higher carbonization degree of a carbon material. For Raman measurement, the carbon membrane for fluid separation is cut, and a transverse section, a vertical section, and an inner surface (in the case of a hollow fiber) of the carbon membrane for fluid separation are analyzed.

When the $R_s$ value is 1.0 or less, the porous carbon support has a small hygroscopic dimensional change rate. Therefore, the carbon membrane for fluid separation little shrinks during the vacuum desorption step before permeation of a fluid or during permeation of a fluid, and the breakage of the carbon membrane for fluid separation is suppressed. The smaller the $R_s$ value is, the smaller the hygroscopic dimensional change rate is. Therefore, the $R_s$ value is preferably 0.98 or less, more preferably 0.96 or less. On the other hand, a small $R_s$ value increases the brittleness of the carbon membrane for fluid separation, and deteriorates the handleability of the carbon membrane for fluid separation. Therefore, the $R_s$ value is preferably 0.82 or more, more preferably 0.85 or more.

In addition, when the $R_s$ value of the porous carbon support is 1.0 or less, there is also an effect that variations in fluid permeation rate and separation factor among a plurality of carbon membranes for fluid separation or separation modules manufactured under the same conditions are reduced.

The reason why a small $R_s$ value of the porous carbon support leads to a small hygroscopic dimensional change rate is not clear, but it is presumed as follows as a hypothesis. Specifically, when the $R_s$ value is large (the carbonization degree is low), water vapor is adsorbed onto the porous carbon support mainly containing amorphous carbon to increase the volume of the amorphous carbon, and the porous carbon support is swollen and elongate. On the other hand, when the $R_s$ value is small (the carbonization degree is high), the water vapor adsorption amount decreases due to an increase in crystallinity or an increase in hydrophobicity due to a decrease in the amount of functional groups of amorphous carbon, and the volume increase rate of carbon is reduced. It is presumed that the hygroscopic dimensional change rate decreases accordingly.

Kaneko et al. studied, about an activated carbon fiber made from cellulose and polyacrylonitrile, the relationship between the radius of inertia $R_g$ (equivalent to the micropore size of carbon) and the relative humidity, and reported a phenomenon that an atmosphere with a high relative humidity leads to a larger $R_g$, that is, a larger micropore size of carbon (K Kaneko et al., J. Colloid. Interface Sci. 127 (1) (1989) 298-299). Specifically, a carbon material having a high carbonization degree has a small water vapor adsorption amount, and thus causes less structural change in the carbon material. It is presumed that the hygroscopic dimensional change rate consequently decreases.

The carbon elemental composition $C_s$ obtained by measuring a surface of the porous carbon support of the present invention by X-ray photoelectron spectroscopy is preferably 85 atomic % or more and 95 atomic % or less. When the carbon atom elemental composition $C_s$ at a surface of the porous carbon support is within the above-mentioned range, the hygroscopic dimensional change rate $\Delta L_1$ described later easily falls within the range of 0% or more and 0.15% or less. Herein, in the X-ray photoelectron spectroscopy, wide scan analysis is performed, and the percentage of carbon atoms based on the total number of atoms of all the elements present on the specimen surface taken as 100 atomic % is defined as the carbon elemental composition. The water vapor adsorption amount is correlated with the amount of various functional groups contained in the carbon material. The smaller the amount of functional groups is, the smaller the water vapor adsorption amount tends to be. Therefore, the larger the carbon elemental composition $C_s$ at a surface of the porous carbon support is, the smaller the amount of functional groups contained in the porous carbon support is, and the more easily the hygroscopic dimensional change rate $\Delta L_1$ falls within the above-mentioned range. The carbon elemental composition $C_s$ at a surface of the porous carbon support is more preferably 87 atomic % or more. On the other hand, a large carbon elemental composition $C_s$ at a surface of the porous carbon support increases the brittleness of the carbon membrane for fluid separation, and deteriorates the handleability and flexibility of the carbon membrane for fluid separation. Therefore, the carbon elemental composition $C_s$ at a surface of the porous carbon support is more preferably 93 atomic % or less. For X-ray photoelectron spectroscopic measurement, the carbon membrane for fluid separation is cut, and a transverse section and a vertical section as well as an inner surface in the case of a hollow fiber of the carbon membrane for fluid separation are analyzed.

The porous carbon support is a base material that supports the dense carbon layer serving as a separation membrane. Therefore, preferable ranges of the hygroscopic dimensional change rate $\Delta L_1$, hygroscopic dimensional change rate $\Delta L_2$ described later, hygroscopic dimensional change rate $\Delta L_3$ described later, toluene adsorption dimensional change rate $\Delta M$ described later, and moisture absorption rate in a standard state described later of a fluid separation membrane described later can be applied as they are to the porous carbon support. The details of various values of the porous carbon support will be described later as physical properties of the carbon membrane for fluid separation, and as for the methods for measuring these values, the "carbon membrane for fluid separation" shall be read as the "porous carbon support".

As described later, various resins can be used as a precursor of the porous carbon support. In particular, it is preferable that the precursor of the porous carbon support be polyacrylonitrile or an aromatic polyimide because the hygroscopic dimensional change rates $\Delta L_1$, $\Delta L_2$, and $\Delta L_3$ easily fall within the ranges of the present invention, and the carbon membrane for fluid separation is excellent in dimensional stability. The precursor of the porous carbon support is more preferably polyacrylonitrile because the carbon membrane for fluid separation has higher elongation at break and higher flexibility.

The composition of the aromatic polyimide is not particularly limited, and various aromatic polyimides can be used. Examples of the aromatic polyimide include "Matrimid" (registered trademark) and "P84" (registered trademark). Moreover, a polyamic acid that is a precursor of the aromatic polyimide can also be used.

The fact that the precursor resin is the above-mentioned polyacrylonitrile or aromatic polyimide can be confirmed, for example, by analyzing the surface of the porous carbon support by means of X-ray photoelectron spectroscopy (XPS), time-of-flight secondary ion mass spectrometry (TOF-SIMS), scanning electron microscopy-energy dispersive X-ray spectroscopy (SEM-EDX) or the like to find that the resin contains a nitrogen element. For example, when the composition of the precursor is polyacrylonitrile, the fact that the precursor resin is polyacrylonitrile can be confirmed by the measurement of the surface of the porous carbon support by means of X-ray photoelectron spectroscopy (XPS) from the fact that the nitrogen concentration (N/C ratio: nitrogen elemental composition/carbon elemental composition) falls within the range of 0.01 or more and 0.06 or less. Alternatively, in the case of an aromatic polyimide containing a trifluoromethyl group ($CF_3$ group), the presence of the trifluoromethyl group can be confirmed by various elemental analysis methods such as XPS and SEM-EDX from the fact that the precursor resin contains a fluorine atom.

[Dense Carbon Layer]

The dense carbon layer according to an embodiment of the present invention is provided on the porous carbon support and serves as a fluid separation layer. The dense carbon layer is a layer made from carbon, and has no pores observed with a scanning electron microscope in the surface or cross section thereof. The phrase "have no pores observed with a scanning electron microscope" means that no clear pores are seen when a cross section formed by the cross-section polisher method (CP method) is observed at a magnification of 1±0.1 (nm/pixel) because the pores are smaller than the resolution limit of the microscope.

The dense carbon layer is usually provided on an outer surface side of the porous carbon support. In the case of a hollow fiber carbon membrane for fluid separation, the dense carbon layer may be provided on an inner surface side, that is, on a side of a surface of the porous carbon support in contact with the hollow portion, or may be provided on both the outer surface side and the inner surface side of the porous carbon support. In the case of a film type carbon membrane for fluid separation, the dense carbon layer may be provided at both surfaces or only one surface of the film. When the dense carbon layers are provided at both surfaces of the film, a fluid can be supplied to the porous carbon support from the cross section of the film to separate the fluid by means of the dense carbon layers at both the surfaces of the film type carbon membrane for fluid separation.

The thickness, that is, the film thickness of the dense carbon layer is not particularly limited, and can be appropriately determined depending on the application. In general, if the film thickness is large, the permeation rate of a fluid is low. Therefore, the film thickness is preferably 10 μm or less, more preferably 5 μm or less, still more preferably 1 μm or less. Alternatively, if the film thickness is small, defects are likely to occur, and a fluid may leak to deteriorate the separation function. Therefore, the film thickness is preferably 1 nm or more, more preferably 10 nm or more. Herein, the thickness of the dense carbon layer is obtained by observing a cross section of the carbon membrane for fluid separation (in the case of a fibrous carbon membrane for fluid separation, a cross section perpendicular to the fiber axis, and in the case of a film-like carbon membrane for fluid separation, a cross section in the thickness direction) with a scanning electron microscope, and refers to the shortest distance between an arbitrary point on the boundary between the void and carbon of the porous carbon support and an arbitrary point on the surface of the dense carbon layer. When the dense carbon layer is provided on the outer surface side of the porous carbon support, the "surface of the dense carbon layer" is the outer surface of the carbon membrane for fluid separation.

The carbon elemental composition $C_m$ at a surface of the dense carbon layer measured by X-ray photoelectron spectroscopy is preferably 75 atomic % or more and 90 atomic % or less. Further, the nitrogen elemental composition $N_m$ at a surface of the dense carbon layer is preferably 4 atomic % or more and 15 atomic % or less. When the elemental compositions are within the above-mentioned ranges, the carbon membrane for fluid separation is excellent in permeability to fluids and fluid separation properties, and is particularly excellent in the permeation rate in the case of selectively passing an acidic gas such as carbon dioxide through the membrane to separate the gas. Preferable ranges of the carbon elemental composition $C_m$ and the nitrogen elemental composition $N_m$ at a surface of the dense carbon layer can be determined from the permeability to fluids and fluid separation properties. The carbon elemental composition $C_m$ at a surface of the dense carbon layer is more preferably 80 atomic % or more. The nitrogen elemental composition $N_m$ at a surface of the dense carbon layer is more preferably 5 atomic % or more and 10 atomic % or less.

Further, the nitrogen concentration ($N_m/C_m$: nitrogen elemental composition/carbon elemental composition) of the dense carbon layer measured by X-ray photoelectron spectroscopy is preferably 0.05 or more and 0.25 or less. When the nitrogen concentration is within the above-mentioned range, the carbon membrane for fluid separation is excellent in permeability to fluids and fluid separation properties. The nitrogen concentration within the above-mentioned range is preferable particularly when an acidic gas such as carbon dioxide is selectively separated, because the carbon membrane for fluid separation has high permeation rate of carbon dioxide. The nitrogen concentration ($N_m/C_m$) of the dense carbon layer is more preferably 0.07 or more and 0.15 or less because the carbon membrane for fluid separation is excellent in the balance between permeability to fluids and fluid separation properties.

The R value of the dense carbon layer, that is, the $R_m$ value, is preferably 1.1 or more and 2.4 or less, where the R value is calculated from a spectrum of the dense carbon layer that is obtained by measurement with Raman spectroscopy. When the $R_m$ value is within the above-mentioned range, the carbon membrane for fluid separation is excellent in permeability to fluids and fluid separation properties. The carbon membrane for fluid separation according to the present invention is preferably intended for gas separation. When the $R_m$ value is within the above-mentioned range particularly in a hydrogen/carbon dioxide, carbon dioxide/nitrogen, or carbon dioxide/methane separation system, high hydrogen or carbon dioxide permeation rate and high separation factor are obtained.

When the $R_m$ value is 1.1 or more, the permeation rate of gases such as hydrogen and carbon dioxide tends to be high. Therefore, the $R_m$ value is preferably 1.3 or more, more preferably 1.5 or more. On the other hand, when the $R_m$ value is 2.4 or less, the separation factor tends to be high. Therefore, the $R_m$ value is preferably 2.3 or less, more preferably 2.2 or less. Further, when a fluid to be passed through the carbon membrane for fluid separation contains water or water vapor, an $R_m$ value of 2.3 or less is preferable because the carbon membrane for fluid separation has a small water vapor adsorption amount, and reduction in the permeation rate over time is suppressed.

Similarly to the porous carbon support described above, the precursor of the dense carbon layer is preferably polyacrylonitrile, an aromatic polyimide, or a polyamic acid that is a precursor of an aromatic polyimide. When the precursor of the dense carbon layer is any of these resins, the carbon membrane for fluid separation is excellent in permeability to fluids and fluid separation properties. The precursor of the dense carbon layer is more preferably polyacrylonitrile, because the production cost is lower, defects are less likely to occur in the dense carbon layer when carbon membranes for fluid separation come into contact with each other in a separation module, and a decrease in the separation factor can be suppressed during use of a separation module.

The fact that the precursor of the dense carbon layer is polyacrylonitrile or an aromatic polyimide can be confirmed by analyzing the surface of the porous carbon support by means of X-ray photoelectron spectroscopy (XPS), time-of-flight secondary ion mass spectrometry (TOF-SIMS), scanning electron microscopy-energy dispersive X-ray spectroscopy (SEM-EDX) or the like to find that the precursor contains a nitrogen element. Further, when the composition of the precursor is polyacrylonitrile, the fact that the precursor is polyacrylonitrile can be confirmed, for example, in measurement of a surface of the dense carbon layer by X-ray photoelectron spectroscopy (XPS) from the fact that when the C1s peak is corrected to 284.6 eV, a peak is observed at an energy position of 398.4 eV (±0.5 eV) in an N1s core spectrum, and that the nitrogen concentration ($N_m/C_m$: nitrogen elemental composition/carbon elemental composition) is within the range of 0.05 or more and 0.25 or less. The peak at 398.4 eV in the N1s core spectrum is a peak attributed to a carbon-nitrogen double bond or triple bond.

<Carbon Membrane for Fluid Separation>

The carbon membrane for fluid separation according to an embodiment of the present invention has a structure including a porous carbon support and a dense carbon layer provided on the porous carbon support.

In the carbon membrane for fluid separation according to an embodiment of the present invention, the ratio between the $R_m$ value of the dense carbon layer and the $R_s$ value of the porous carbon support, that is, $R_m/R_s$, is preferably 1.1 or more and 3.0 or less. As described above, when $R_m/R_s$ is within the above-mentioned range in addition to the $R_s$ of 1.0 or less, a combination of a relatively high carbonization degree of the carbon support and a relatively low carbonization degree of the dense carbon layer is realized. Thus, the separation membrane is excellent in permeability to fluids and fluid separation properties while suppressing dimensional change of the support due to moisture absorption as well as breakage of the separation membrane. An $R_m/R_s$ of 1.5 or more and 2.5 or less is more preferable because all of dimensional stability, permeability to fluids, and fluid separation properties are achieved.

Further, the ratio between the carbon elemental composition $C_s$ (atomic %) at a surface of the porous carbon support and the carbon elemental composition $C_m$ (atomic %) at a surface of the dense carbon layer, that is, $C_m/C_s$, is preferably 0.85 or more and 0.95 or less, where the carbon elemental compositions $C_s$ and $C_m$ are measured by X-ray photoelectron spectroscopy. When the ratio is within the above-mentioned range, the carbon membrane for fluid separation has a structure in which carbonization of the porous carbon support is promoted compared to the dense carbon layer. Therefore, it is possible to achieve both the suppression of breakage of the carbon membrane for fluid separation and the improvement of permeability to fluids and fluid separation properties.

As described above, the closer the hygroscopic dimensional change rate of the carbon membrane for fluid separation is to 0%, the more remarkably the breakage of the carbon membrane for fluid separation in a fluid separation module can be suppressed during a vacuum desorption step before permeation of a fluid or during permeation of a fluid. In particular, when a supplied gas contains various impurity components in various applications described later, the fluid can be stably separated. Therefore, in an embodiment of the present invention, the hygroscopic dimensional change rate $\Delta L_1$ of the carbon membrane for fluid separation calculated by a formula shown below is preferably 0% or more and 0.15% or less.

$$\Delta L_1 = \{(L_{100\%} - L_{1\%})\} \times 100$$

$L_{1\%}$: the dry length (mm) of the carbon membrane for fluid separation after being left to stand for 3 hours in a dry air (temperature: 20° C., relative humidity: 1.0%) environment $L_{100\%}$: the length (mm) of the carbon membrane for fluid separation after being left to stand for 3 hours in a saturated water vapor (temperature: 20° C., relative humidity: 100%) environment Herein, the length of the porous carbon support is the length in the fiber axis direction. The length can be measured by a method of measuring a specimen having a length of 100 mm or more with a stainless steel scale specified in JIS B7516 (2005) in a thermostatic chamber or a vacuum dryer, or a method of measuring the length by a thermomechanical analyzer (humidity-controlled TMA) capable of adjusting the relative humidity.

When the hygroscopic dimensional change rate $\Delta L_1$ of the carbon membrane for fluid separation is 0% or more and 0.15% or less, shrinkage and elongation of the carbon membrane for fluid separation are suppressed in various water vapor-containing atmosphere environments, so that breakage of the carbon membrane for fluid separation in a fluid separation module is significantly suppressed. The hygroscopic dimensional change rate $\Delta L_1$ is preferably as close as possible to 0%. Therefore, the hygroscopic dimensional change rate $\Delta L_1$ is preferably 0.12% or less, more preferably 0.10% or less.

Further, the hygroscopic dimensional change rate $\Delta L_2$ of the carbon membrane for fluid separation calculated by a formula shown below is preferably 0% or more and 0.1% or less.

$$\Delta L_2 = \{(L_{100\%} - L_{65\%})/L_{65\%}\} \times 100$$

$L_{65\%}$: the length (mm) of the carbon membrane for fluid separation after being left to stand for 3 hours in a standard state (temperature: 20° C., relative humidity: 65%)

$L_{100\%}$: the length (mm) of the carbon membrane for fluid separation after being left to stand for 3 hours in a saturated water vapor (temperature: 20° C., relative humidity: 100%) environment When the hygroscopic dimensional change rate $\Delta L_2$ of the carbon membrane for fluid separation is 0% or more and 0.1% or less, the elongation of the carbon membrane for fluid separation is suppressed in the case where the fluid contains a large amount of water vapor, so that breakage of the carbon membrane for fluid separation in a fluid separation module is suppressed. The hygroscopic dimensional change rate $\Delta L_2$ is preferably as close as possible to 0%. Therefore, the hygroscopic dimensional change rate $\Delta L_2$ is more preferably 0.08% or less, still more preferably 0.05% or less.

Further, the hygroscopic dimensional change rate $\Delta L_3$ of the carbon membrane for fluid separation calculated by a formula shown below is preferably −0.1% or more and 0% or less.

$$\Delta L_3 = \{(L_{1\%} - L_{65\%})/L_{65\%}\} \times 100$$

$L_{65\%}$: the length (mm) of the carbon membrane for fluid separation after being left to stand for 3 hours in a standard state (temperature: 20° C., relative humidity: 65%) environment $L_{1\%}$: the length (mm) of the carbon membrane for fluid separation after being left to stand for 3 hours in a dry air (temperature: 20° C., relative humidity: 1.0%) environment When the hygroscopic dimensional change rate $\Delta L_3$ of the carbon membrane for fluid separation is −0.1% or more and 0% or less, the shrinkage of the carbon membrane for fluid separation is suppressed in the case where the fluid contains a small amount of water vapor, so that breakage of the carbon membrane for fluid separation in a fluid separation module is suppressed. The hygroscopic dimensional change rate $\Delta L_3$ is preferably as close as possible to 0%. Therefore, the hygroscopic dimensional change rate $\Delta L_3$ is preferably −0.08% or more, more preferably −0.05% or more.

The carbon membrane for fluid separation preferably has a dimensional change rate close to 0% when adsorbing various volatile solvents in addition to the case where it adsorbs water vapor. Examples of the type of solvent include benzene, toluene, ethylbenzene, n-hexane, n-heptane, o-xylene, m-xylene, p-xylene, cyclohexane, methanol, ethanol, propanol, isopropanol, diethylene glycol, tetrahydrofuran, acetone, N,N-dimethylformamide, dimethyl sulfoxide, and N-methyl-2-pyrrolidone.

Specifically, the carbon membrane for fluid separation according to the present invention preferably has a toluene adsorption dimensional change rate $\Delta M$ represented by a formula shown below of 0% or more and 0.1% or less.

$$\Delta M = \{(M_2 - M_1)/M_1\} \times 100$$

$M_1$: the length (mm) of the carbon membrane for fluid separation after being left to stand for 3 hours in a reduced pressure atmosphere (10 Pa) at a temperature of 20° C.

$M_2$: the length (mm) of the carbon membrane for fluid separation after being left to stand for 3 hours in a toluene atmosphere containing the air at a temperature of 20° C.

Herein, the toluene atmosphere is an atmosphere of toluene-containing vapor obtained by flowing dry air into toluene at 20° C. with bubbling.

The toluene adsorption dimensional change rate is preferably as close as possible to 0%. The toluene adsorption dimensional change rate $\Delta M$ is preferably 0.08% or less, more preferably 0.06% or less.

The carbon membrane for fluid separation according to the present invention preferably has a moisture absorption rate in a standard state (temperature: 20° C., relative humidity: 65%) of 0 wt % or more and 15 wt % or less. When the moisture absorption rate is close to 0 wt %, the hygroscopic dimensional change rate is small. Therefore, the moisture absorption rate in a standard state is more preferably 10 wt % or less, still more preferably 5 wt % or less. The moisture absorption rate is calculated by a formula shown below using a thermogravimetric measurement (TG) device.

As described above, when the R value ($R_s$ value) of the porous carbon support calculated from the Raman spectrum is 1.0 or less, the moisture absorption rate tends to be low, and the dimensional change rate of the carbon membrane for fluid separation in various relative humidity atmospheres is small.

$$\text{Moisture absorption rate [wt \%]} = \{(b-a)/a\} \times 100$$

a: the dry weight (mg) of the carbon membrane for fluid separation, b: the moisture absorbent weight (mg) of the carbon membrane for fluid separation Herein, the moisture absorbent weight is a weight measured with a TG device after the carbon membrane for fluid separation is left to stand for 3 hours in a standard state, and the dry weight is a weight measured with a TG device after the carbon membrane for fluid separation is heated from 20° C. to 150° C. at a temperature rise rate of 10° C./min in a nitrogen flow and then held for 3 hours.

In the carbon membrane for fluid separation according to the present invention, a resin layer may be further provided on the dense carbon layer. The resin layer is provided for the purpose of protecting the carbon membrane for fluid separation, improving the pressure resistance, chemical resistance, permeability, and separation properties, and suppressing any temporal change of these characteristics. Examples of the composition of the resin layer include aromatic polyimides, aromatic polyamides, cellulose acetate, polysulfone, polyetherimide, polyamideimide, polyethersulfone, polyacrylonitrile, polyphenylene sulfide, polyetheretherketone, polytetrafluoroethylene, polyvinylidene fluoride, and silicone resins such as polydimethylsiloxane.

The carbon membrane for fluid separation according to the present invention can be used in a fluid separation module including a bundle of a plurality of the carbon membranes for fluid separation and a vessel accommodating the bundle. In particular, the fluid separation membrane according to the present invention is preferably used for gas separation. Specifically, the fluid separation membrane can be preferably used in applications such as production of hydrogen, separation and recovery of carbon dioxide, separation and recovery of exhaust gas, separation of natural gas, gas dehumidification, and production of oxygen from the air. In these applications, the supplied gas may contain water vapor or impurity components such as volatile organic solvents, and the composition and amount of components of the gas may change over time. Therefore, there is a concern that the carbon membrane for fluid separation may be broken during use. However, the carbon membrane for fluid separation according to an embodiment of the present invention has a dimensional change rate close to 0% when absorbing moisture or adsorbing a volatile organic solvent, and thus the carbon membrane for fluid separation can stably separate a fluid.

<Method for Manufacturing Carbon Membrane for Fluid Separation>

As an exemplary method, the carbon membrane for fluid separation according to the present invention can be manufactured by a method for manufacturing a carbon membrane for fluid separation, the method including the steps of: carbonizing a molded body containing a resin serving as a precursor of a porous carbon support at 900° C. or more and 1,500° C. or less to produce a porous carbon support (step 1); forming, on the porous carbon support, a carbonizable resin layer serving as a precursor of a dense carbon layer (step 2); and carbonizing the carbonizable resin layer to form a dense carbon layer (step 3).

[Step 1]

Step 1 is a step of carbonizing a molded body containing a resin serving as a precursor of a porous carbon support (hereinafter, the resin is sometimes referred to as a "support precursor resin") at 900° C. or more and 1,500° C. or less to produce a porous carbon support.

The resin serving as a precursor of a porous carbon support (hereinafter, the resin is sometimes referred to as a "support precursor resin") used can be a thermoplastic resin or a thermosetting resin. Examples of the thermoplastic resin include polyphenylene ether, polyvinyl alcohol, polyacrylonitrile, phenol resins, aromatic polyesters, polyamic acids, aromatic polyimides, aromatic polyamides, polyvinylidene fluoride, cellulose acetate, polyetherimide, polyamideimide, and copolymers of these resins. Examples of the thermosetting resin include unsaturated polyester resins, alkyd resins, melamine resins, urea resins, polyimide resins, diallyl phthalate resins, lignin resins, urethane resins, phenol resins, polyfurfuryl alcohol resins, and copolymers of these resins. These resins may be used alone, or a plurality of the resins may be used.

The support precursor resin used is preferably a thermoplastic resin capable of solution spinning. In particular, use of polyacrylonitrile, an aromatic polyimide, or a polyamic acid is preferable because the hygroscopic dimensional change rate $\Delta L_1$ of the porous carbon support is small.

The molecular weight of the support precursor resin is preferably 10,000 or more in terms of weight average molecular weight. When the weight average molecular weight is 10,000 or more, yarn breakage in the spinning step and film breakage in the film forming step are reduced. On the other hand, a weight average molecular weight of 1,000,000 or less is preferable because moldability including spinnability and film forming properties is improved.

When the porous carbon support is made of fibers, in this step, it is preferable to first form a precursor fiber by solution spinning. The support precursor resin used is preferably a thermoplastic resin capable of solution spinning. Solution spinning is a method of obtaining a fiber by dissolving a resin in some solvent to produce a spinning stock solution, and passing the spinning stock solution through a bath containing a solvent that serves as a poor solvent for the resin to solidify the resin. Publicly known solution spinning methods such as dry-wet spinning and wet spinning can be employed.

It is preferable to add, to the molded body containing the support precursor resin, a disappearing component that can disappear after molding in addition to the support precursor resin. For example, it is possible to form a porous structure as well as control the average pore diameter of the porous structure by forming a resin mixture with a resin that disappears by post heating during carbonization or the like, or by dispersing particles that disappear by post heating during carbonization or the like.

As an example of a means for obtaining the molded body containing the support precursor resin, an example in which a resin that disappears after carbonization (disappearing resin) is added will be described. First, the support precursor resin is mixed with the disappearing resin to produce a resin mixture. The mixing ratio is preferably 10 to 90 wt % of the disappearing resin based on 10 to 90 wt % of the support precursor resin.

Herein, the disappearing resin is preferably selected from resins that are compatible with the carbonizable resin. The method of compatibilizing the resins may be mixing of the resins alone or addition of a solvent. Such a combination of the carbonizable resin and the disappearing resin is not limited, and examples include polyacrylonitrile/polyvinyl alcohol, polyacrylonitrile/polyvinyl phenol, polyacrylonitrile/polyvinyl pyrrolidone, and polyacrylonitrile/polylactic acid.

The obtained resin mixture is preferably subjected to phase separation during the molding process. The method for phase separation is not limited, and examples thereof include a thermally induced phase separation method and a non-solvent induced phase separation method.

A hollow fiber can be obtained, for example, by a method of extruding the resin mixture produced as described above from an outer tube of a hollow fiber spinneret having a double-tube structure, and simultaneously discharging a solution in which a gas such as the air or nitrogen, the same solvent as that of the spinning stock solution, and the disappearing resin are dissolved from an inner tube of the spinneret.

In addition, appropriately controlling the spinning conditions can suppress formation of a dense layer on the outer periphery of the fiber, and can open pores having a porous structure at the surface of the porous carbon support. For example, when a fiber is spun using the non-solvent induced phase separation method, there can be mentioned a technique of appropriately controlling the composition and temperature of the spinning stock solution or the coagulation bath, and a technique of discharging the spinning solution from the inner tube, and simultaneously discharging a solution in which the same solvent as that of the spinning stock solution and the disappearing resin are dissolved from the outer tube.

The fiber spun by the above-mentioned method can be coagulated in the coagulation bath, followed by washing with water and drying to produce a precursor of a porous carbon support. Examples of the coagulating liquid include water, ethanol, saline, and a mixed solvent containing any of these liquids and the solvent used in step 1. In addition, the fiber can be immersed in a coagulation bath or a water bath before a drying step to elute the solvent or the disappearing resin.

Meanwhile, when the porous carbon support is a film, a molded body containing the support precursor resin can be produced by a publicly known casting method or spin coating method.

The precursor of the porous carbon support produced by the above-mentioned method can be subjected to an infusibilization treatment before a carbonization treatment. The method of the infusibilization treatment is not limited, and a publicly known method can be employed. Examples of a specific method include a method of causing oxidative crosslinking by heating the precursor in the presence of oxygen, a method of forming a crosslinked structure by irradiating the precursor with high energy rays such as electron beams or gamma rays, and a method of forming a crosslinked structure by impregnating or mixing the precursor with a substance having a reactive group. Among them, the method of causing oxidative crosslinking by heating the precursor in the presence of oxygen is preferable because the process is simple and the production cost is lower. These techniques may be used alone or in combination.

The precursor of the porous carbon support subjected to the infusibilization treatment as necessary is finally carbonized into a porous carbon support. The carbonization is preferably performed by heating in an inert gas atmosphere. Herein, examples of the inert gas include helium, nitrogen, and argon. The flow rate of the inert gas has only to be a flow rate at which the oxygen concentration in the heating device can be sufficiently lowered, and it is preferable to appropriately select an optimal flow rate value in accordance with the size of the heating device, the supplied amount of the raw material, the carbonization temperature and the like. The disappearing resin may be removed by thermal decomposition with heat generated during carbonization.

In order to obtain a porous carbon support having the above-mentioned predetermined $R_s$ value, the molded body is preferably carbonized at a carbonization temperature of 900° C. or more and 1,500° C. or less. Herein, the carbonization temperature is the maximum attained temperature during the carbonization treatment. In order to reduce the hygroscopic dimensional change rate OLi, the carbonization temperature is more preferably 950° C. or more. On the other hand, if the carbonization temperature is too high, the brittleness increases and the handleability is deteriorated. Therefore, the carbonization temperature is more preferably 1,300° C. or less. Setting the carbonization temperature within the above-mentioned range brings the $R_s$ value and the hygroscopic dimensional change rate $\Delta L_1$ into the above-mentioned ranges, and can suppress the breakage of the carbon membrane for fluid separation during the vacuum desorption step before permeation of a fluid or during permeation of a fluid.

When the carbonization treatment is continuously performed, a method of continuously feeding and taking out the porous carbon support into and from a heating device kept at a constant temperature using a roller, a conveyor or the like is preferable for increasing the productivity. Meanwhile, when batch processing is performed in a heating device, the temperature rise rate and the temperature decrease rate can be arbitrarily determined. A rate of 1° C./min or more is preferable from the viewpoint of productivity. The upper limit of the temperature rise rate or the temperature decrease rate is not limited, and the rates can be arbitrarily determined within a range in which defects such as cracks do not occur.

Moreover, the holding time of the carbonization temperature can be arbitrarily determined. The holding time can be determined within a range in which the porous carbon support does not shrink in the second carbonization treatment (step 3) for forming a dense carbon layer described later, and is preferably 1 minute or longer and 3 hours or shorter.

One preferable method for adjusting the hygroscopic dimensional change rate $\Delta L_1$ of the porous carbon support within the above-mentioned range is to add a crosslinking agent to the precursor fiber. The crosslinking agent may be added by mixing with the spinning stock solution, or added by immersing the precursor fiber in a solution containing the crosslinking agent during or after any of the steps of the coagulation bath, water washing, and drying described later. The crosslinking agent may be a compound that reacts with the precursor resin, or a crosslinking agent that does not react with the precursor resin and crosslinks with another crosslinking agent. Usable crosslinking agents are various silane coupling agents and polyfunctional epoxy compounds.

Another preferable method for adjusting the hygroscopic dimensional change rate $\Delta L_1$ of the porous carbon support within the above-mentioned range is to stretch the precursor fiber. Stretching the precursor fiber to orient the carbonizable resin in the fiber axis direction can suppress the hygroscopic dimensional change of the porous carbon support.

Still another preferable method for adjusting the hygroscopic dimensional change rate $\Delta L_1$ of the porous carbon support within the above-mentioned range is to set the carbonization temperature of the precursor fiber to 900° C. or more and 1,500° C. or less. Herein, the carbonization temperature is the maximum attained temperature during the carbonization treatment. The carbonization temperature is more preferably 950° C. or more because a high carbonization temperature brings the hygroscopic dimensional change rate $\Delta L_1$ close to 0%. On the other hand, if the carbonization temperature is too high, the brittleness increases and the handleability may be deteriorated. Therefore, the carbonization temperature is more preferably 1,300° C. or less.

These methods can be used in appropriate combination in order to adjust the hygroscopic dimensional change rate $\Delta L_1$ within the above-mentioned range.

[Surface Treatment of Porous Carbon Support]

Before the carbonizable resin layer is formed on the porous carbon support in step 2 described later, the porous carbon support may be subjected to a surface treatment in order to improve adhesion to the carbonizable resin layer. Examples of such surface treatment include an oxidation treatment and a chemical coating treatment. Examples of the oxidation treatment include chemical oxidation by nitric acid or sulfuric acid, electrolytic oxidation, vapor phase oxidation, and ultraviolet irradiation. Examples of the chemical coating treatment include addition of a primer or a sizing agent to the porous carbon support.

[Step 2]

Step 2 is a step of forming, on the porous carbon support prepared in step 1 and further subjected to a surface treatment as necessary, a carbonizable resin layer serving as a precursor of a dense carbon layer. The thickness of the dense carbon layer can be arbitrarily determined by producing the porous carbon support and the dense carbon layer in separate steps. Therefore, the structure of the separation membrane can be easily designed, for example, the permeation rate of a fluid can be improved by reducing the thickness of the dense carbon layer.

For the carbonizable resin, various resins exhibiting fluid separation properties after carbonization can be employed. Specific examples of the carbonizable resin include polyacrylonitrile, aromatic polyimides, polyamic acids, polybenzoxazole, aromatic polyamides, polyphenylene ether, phenol resins, cellulose acetate, polyfurfuryl alcohol, polyvinylidene fluoride, lignin, wood tar, and polymers of intrinsic microporosity (PIMs). The resin layer is preferably made from polyacrylonitrile, an aromatic polyimide, or a polyamic acid. The carbonizable resin may be the same as or different from the above-mentioned support precursor resin.

The method for forming the carbonizable resin layer is not limited, and a publicly known method can be employed. A general forming method is a method of applying the carbonizable resin as it is to the porous carbon support. It is possible to employ a method of applying a precursor of the resin to the porous carbon support, and then reacting the precursor to form the carbonizable resin layer, or a counter diffusion method of flowing a reactive gas or solution from the outside and inside of the porous carbon support to cause a reaction. Examples of the reaction include polymerization, cyclization, and crosslinking reaction by heating or a catalyst.

Examples of the coating method for forming the carbonizable resin layer include a dip coating method, a nozzle coating method, a spray method, a vapor deposition method, and a cast coating method. In view of ease of the production method, a dip coating method or a nozzle coating method is preferable when the porous carbon support is fibrous, and a dip coating method or a cast coating method is preferable when the porous carbon support is film-like.

The dip coating method is a method of immersing the porous carbon support in a coating stock solution containing a solution of the carbonizable resin or a precursor of the resin, and then withdrawing the porous carbon support from the coating stock solution.

The viscosity of the coating stock solution in the dip coating method is arbitrarily determined according to conditions such as the surface roughness of the porous carbon support, the withdrawal speed, and the desired film thickness. When the coating stock solution is viscous, a uniform resin layer can be formed. Therefore, the shear viscosity at a shear rate of 0.1 $s^{-1}$ is preferably 10 mPa·s or more, more preferably 50 mPa·s or more. On the other hand, the lower the viscosity of the coating stock solution is, the thinner the film is and the higher the permeation rate of a fluid is. Therefore, the shear viscosity is preferably 1,000 mPa·s or less, more preferably 800 mPa·s or less.

The withdrawal speed of the porous carbon support in the dip coating method is also arbitrarily determined according to the coating conditions. A high withdrawal speed provides a thick carbonizable resin layer, and can suppress defects as a carbon membrane. Therefore, the withdrawal speed is preferably 1 mm/min or more, more preferably 10 mm/min or more. On the other hand, if the withdrawal speed is too high, the carbonizable resin layer may have a non-uniform film thickness, resulting in defects, or the carbonizable resin layer may have a large film thickness to decrease the permeation rate of a fluid. Therefore, the withdrawal speed is preferably 1,000 mm/min or less, more preferably 800 mm/min or less. The temperature of the coating stock solution is preferably 20° C. or more and 80° C. or less. When the coating stock solution has a high temperature, the coating stock solution has low surface tension to improve the wettability to the porous carbon support, and the carbonizable resin layer has a uniform thickness.

The nozzle coating method is a method of laminating a resin or a resin precursor on the porous carbon support by passing the porous carbon support through a nozzle filled with a coating stock solution that is a solution of the carbonizable resin or a precursor of the resin. The viscosity and temperature of the coating stock solution, the nozzle diameter, and the passing speed of the porous carbon support can be arbitrarily determined.

[Infusibilization Treatment]

The porous carbon support with the carbonizable resin layer formed thereon (hereinafter referred to as "porous carbon support/carbonizable resin layer composite") produced in step 2 may be subjected to an infusibilization treatment before the carbonization treatment (step 3). The method for the infusibilization treatment is not limited, and conforms to the infusibilization treatment for the precursor of the porous carbon support described above.

[Step 3]

Step 3 is a step of heating the porous carbon support/carbonizable resin layer composite produced in step 2 and further subjected to the infusibilization treatment as necessary to carbonize the carbonizable resin layer, whereby a dense carbon layer is formed.

In this step, the porous carbon support/carbonizable resin layer composite is preferably heated in an inert gas atmosphere. Herein, examples of the inert gas include helium, nitrogen, and argon. The flow rate of the inert gas has only to be a flow rate at which the oxygen concentration in the heating device can be sufficiently lowered, and it is preferable to appropriately select an optimal flow rate value in accordance with the size of the heating device, the supplied amount of the raw material, the carbonization temperature and the like. Although there is no upper limit on the flow rate of the inert gas, it is preferable to appropriate set the flow rate in accordance with the temperature distribution or the design of the heating device from the viewpoint of economic efficiency and of reducing the temperature change in the heating device.

Moreover, it is possible to chemically etch the surface of the porous carbon support to control the pore diameter size at the surface of the porous carbon support by heating the porous carbon support/carbonizable resin layer composite in a mixed gas atmosphere of the above-mentioned inert gas and an active gas. Examples of the active gas include oxygen, carbon dioxide, water vapor, air, and combustion gas. The concentration of the active gas in the inert gas is preferably 0.1 ppm or more and 100 ppm or less.

The carbonization temperature in this step can be arbitrarily determined within a range in which the permeability and separation properties of the carbon membrane for fluid separation are improved, but is preferably lower than the carbonization temperature for carbonizing the precursor of the porous carbon support in step 1. In this case, the permeation rate of a fluid and separation performance can be improved while reducing the hygroscopic dimensional change rate of the porous carbon support and the carbon membrane for fluid separation, and suppressing the breakage of the carbon membrane for fluid separation in a separation module. The carbonization temperature in this step is preferably 500° C. or more, more preferably 550° C. or more. On the other hand, the carbonization temperature is preferably 850° C. or less, more preferably 800° C. or less.

Other preferable aspects and the like of carbonization conform to those of carbonization of the precursor of the porous carbon support described above.

[Post-Treatment Step]

The carbon membrane for fluid separation produced by steps 1 to 3 can be subjected to various publicly known post-treatments in order to achieve a desired permeation rate and a desired separation factor. Examples of the post-treatment include pore control by a heat treatment or chemical vapor deposition (CVD).

EXAMPLES

Preferable examples of the present invention will be described in the following, but the following description should not be construed as limiting the present invention.

[Evaluation Methods]

(R Value Calculated from Raman Spectrum)

A hollow fiber carbon membrane for fluid separation was measured by Raman spectroscopy. The Raman measurement was performed using a laser Raman spectrometer T-64000 manufactured by HORIBA, Ltd. in a micro Raman mode (beam diameter: 1 μm) with an Ar$^+$ laser (514.5 nm). A baseline was obtained by linear approximation in a region of 700 to 2,000 cm$^{-1}$ in the obtained spectrum, and band intensities of the G-band (near 1,580 cm$^{-1}$) and the D-band (near 1,360 cm$^{-1}$) relative to the baseline were read. As for the reading, quadratic function fitting was performed by the least square method on ten to twenty data points near the peak of each band, and each band intensity was calculated from the maximum value. A peak intensity ratio $I_D/I_G$ was defined as an R value, where $I_D$ is the peak intensity of the D-band, and $I_G$ is the peak intensity of the G-band.

Herein, when the dense carbon layer was provided on an outer surface side of the porous carbon support, the R value ($R_m$ value) of the dense carbon layer was measured at the outer surface of the carbon membrane for fluid separation, and the R value ($R_s$ value) of the porous carbon support was measured by cutting the carbon membrane for fluid separation in liquid nitrogen to expose a surface (surface of the hollow portion) of the porous carbon support.

(Analysis by X-Ray Photoelectron Spectroscopy)

A hollow fiber carbon membrane for fluid separation was measured by X-ray photoelectron spectroscopy. For the X-ray photoelectron spectroscopic measurement, QuanteraSXM manufactured by ULVAC-PHI, Inc. was used. The carbon membrane for fluid separation was cut, the cut specimens were spread on a stainless steel sample table, and then the cut specimens were fixed to the stainless steel sample table. Then, the measurement was performed at a photoelectron take-off angle of 45° using monochromatic AlKα$_{1,2}$ rays as an X-ray source with the inside of the sample chamber set to a degree of vacuum of 1×10$^{-8}$ Torr. Intrinsic sensitivity correction values of the device were C1s: 0.314 and N1s: 0.499.

In order to correct the peak in response to the charging during measurement, first, the binding energy value of the C1s main peak (peak top) is adjusted to 284.6 eV. The C1s peak area was obtained by drawing a straight baseline within the range of 282 eV to 296 eV, and the N1s peak area was obtained by drawing a straight baseline within the range of 395 eV to 406 eV. The nitrogen concentration N/C was expressed as an elemental ratio calculated by dividing the ratio of the N1s peak area by the sensitivity correction value intrinsic to the device.

(Measurement of Hygroscopic Dimensional Change Rate $\Delta L_1$)

One end of a carbon membrane for fluid separation having a fiber length of 250 mm was fixed with a tape to a stainless steel scale (nominal size: 300 mm, grade 1) specified in JIS B7516 (2005), and the carbon membrane for fluid separation was suspended in a thermostatic chamber with a glass window. The door of the thermostatic chamber was closed, and then dry air was flowed into the thermostatic chamber using an air compressor to adjust the chamber to room temperature of 20° C. and a relative humidity of 1.0%. The carbon membrane for fluid separation was left to stand for 3 hours, and then the fiber length was measured to the nearest 0.1 mm with the carbon membrane for fluid separation still being placed in the thermostatic chamber, whereby the dry length $L_{1\%}$ was measured.

Then, dry air was bubbled into a water bath having a water temperature of 90° C., and then the resulting water vapor was flowed into the thermostatic chamber to adjust the chamber to room temperature of 20° C. and a relative humidity of 100%. The carbon membrane for fluid separation was left to stand for 3 hours, and then the length Lno % was measured with the carbon membrane for fluid separation still being placed in the thermostatic chamber. Then, the hygroscopic dimensional change rate $\Delta L_1$ (%) was calculated by a formula shown below.

$$\Delta L_1 = \{(L_{100\%} - L_{1\%})/L_{1\%}\} \times 100$$

$L_{1\%}$: the dry length (mm) of the carbon membrane for fluid separation after being left to stand for 3 hours in a dry air (temperature: 20° C., relative humidity: 1.0%) environment $L_{100\%}$: the length (mm) of the carbon membrane for fluid separation after being left to stand for 3 hours in a saturated water vapor (temperature: 20° C., relative humidity: 100%) environment (Measurement of Hygroscopic Dimensional Change Rate $\Delta L_2$)

One end of a carbon membrane for fluid separation having a fiber length of 250 mm was fixed with a tape to a stainless steel scale (nominal size: 300 mm, grade 1) specified in JIS B7516 (2005), and the carbon membrane for fluid separation was suspended in a thermostatic chamber with a glass window. The carbon membrane for fluid separation was left to stand for 3 hours in a laboratory at room temperature of 20° C. and a relative humidity of 65% with the door of the thermostatic chamber open, and then the fiber length was measured to the nearest 0.1 mm, whereby the hygroscopic length $L_{65}\%$ was measured.

Then, dry air was bubbled into a water bath having a water temperature of 90° C., and then the resulting water vapor was flowed into the thermostatic chamber to adjust the chamber to room temperature of 20° C. and a relative humidity of 100%. The carbon membrane for fluid separation was left to stand for 3 hours, and then the length $L_{100\%}$ was measured with the carbon membrane for fluid separation still being placed in the thermostatic chamber. Then, the hygroscopic dimensional change rate $\Delta L_2$ (%) was calculated by a formula shown below.

$$\Delta L_2 = \{(L_{100\%} - L_{65\%})/L_{65\%}\} \times 100$$

$L_{65\%}$: the length (mm) of the carbon membrane for fluid separation after being left to stand for 3 hours in a standard state (temperature: 20° C., relative humidity: 65%)

$L_{100\%}$: the length (mm) of the carbon membrane for fluid separation after being left to stand for 3 hours in a saturated water vapor (temperature: 20° C., relative humidity: 100%) environment (Measurement of Hygroscopic Dimensional Change Rate $\Delta L_3$)

One end of a carbon membrane for fluid separation having a fiber length of 250 mm was fixed with a tape to a stainless steel scale (nominal size: 300 mm, grade 1) specified in JIS B7516 (2005), and the carbon membrane for fluid separation was suspended in a thermostatic chamber with a glass window. The door of the thermostatic chamber was closed, and then dry air was flowed into the thermostatic chamber using an air compressor to adjust the chamber to room temperature of 20° C. and a relative humidity of 1.0%. The carbon membrane for fluid separation was left to stand for 3 hours, and then the fiber length was measured to the nearest 0.1 mm with the carbon membrane for fluid separation still being placed in the thermostatic chamber, whereby the dry length $L_{1\%}$ was measured.

Then, the carbon membrane for fluid separation was left to stand for 3 hours in a laboratory at room temperature of 20° C. and a relative humidity of 65% with the door of the thermostatic chamber open, and then the fiber length was measured to the nearest 0.1 mm, whereby the hygroscopic length $L_{65\%}$ was measured. Then, the hygroscopic dimensional change rate $\Delta L_3$ (%) was calculated by a formula shown below.

$$\Delta L_3 = \{(L_{1\%} - L_{65\%})/L_{65\%}\} \times 100$$

$L_{65\%}$: the length (mm) of the carbon membrane for fluid separation after being left to stand for 3 hours in a standard state (temperature: 20° C., relative humidity: 65%) environment $L_{1\%}$: the length (mm) of the carbon membrane for fluid separation after being left to stand for 3 hours in a dry air (temperature: 20° C., relative humidity: 1.0%) environment (Presence or Absence of Co-Continuous Porous Structure)

A carbon membrane for fluid separation or a porous carbon support was cooled in liquid nitrogen, and then cut with tweezers to produce a cross section. The surface of the porous carbon support portion in the cross section was observed with a scanning electron microscope. When the porous carbon support had a structure in which branches and pores (voids) of the carbon framework were separately regularly intertwined three dimensionally while being continuous, it was determined that the porous carbon support had a co-continuous porous structure.

(Number of Broken Carbon Membranes for Fluid Separation after Decompression)

Twenty 100 mm hollow fiber carbon membranes for fluid separation were bundled, and both ends of the resulting bundle were fixed to a stainless steel vessel with an epoxy resin adhesive under tension so that the bundle would not slacken to produce a separation module. Then, the inside of the separation module was subjected to vacuum desorption for 3 hours, then the pressure was returned to atmospheric pressure, and the number of broken carbon membranes for fluid separation in the separation module was counted.

(Number of Broken Carbon Membranes for Fluid Separation after Carbon Dioxide Flow)

Using the separation module produced as described above, carbon dioxide not containing water vapor was flowed to the outer surface side of the carbon membrane for fluid separation for 3 hours, and then the number of broken carbon membranes for fluid separation in the separation module was counted.

(Number of Broken Carbon Membranes for Fluid Separation after Saturated Water Vapor-Containing Carbon Dioxide Flow)

A carbon dioxide gas was bubbled into a water bath having a water temperature of 90° C., and then flowed to the separation module produced as described above to flow carbon dioxide containing saturated water vapor at a temperature of 20° C. to the outer surface side of the carbon membrane for fluid separation for 3 hours. Then, the number of broken carbon membranes for fluid separation in the module was counted.

(Bend Radius)

As a flexibility test for a carbon membrane, a carbon membrane was wound over 180° or more around cylinders having various diameters, and was observed as to whether the membrane was broken or not. A cylinder having the smallest radius among cylinders on which the membranes did not break was determined, and the value of radius of the cylinder was defined as the bend radius.

(Measurement of Gas Permeation Performance)

Using the separation module produced as described above, the gas permeation rate was measured. The measured gases were carbon dioxide and methane, and the pressure change of carbon dioxide and methane at the permeation side per unit time was measured by an external pressure system at a measurement temperature of 25° C. according to the pressure sensor method of JIS K7126-1 (2006). Herein, the pressure difference between the supply side and the permeation side was set to 0.11 MPa.

Then, the gas permeation rate Q was calculated by a formula shown below. Further, the ratio of gas permeation rate between the components was defined as the separation factor α. Herein, the membrane area was calculated from the outer diameter and the length of a region contributing to gas permeation.

Permeation rate $Q$=[amount of passed gas (mol)]/ [membrane area (m$^2$)×time (s)×pressure difference (Pa)]

Production Example 1 of Porous Carbon Support

First, 10 parts by weight of polyacrylonitrile (PAN) (Mw: 150,000) manufactured by Polysciences, Inc., 10 parts by weight of polyvinyl pyrrolidone (PVP) (Mw: 40,000) manufactured by Sigma-Aldrich Japan, and 80 parts by weight of dimethyl sulfoxide (DMSO) manufactured by Wako Pure Chemical Industries, Ltd. were mixed, and the mixture was stirred at 100° C. to produce a spinning stock solution.

The obtained spinning stock solution was cooled to 25° C., and then using a concentric triple spinneret, an 80 wt % aqueous solution of DMSO, the spinning stock solution, and a 90 wt % aqueous solution of DMSO were simultaneously discharged from the inner tube, the middle tube, and the outer tube, respectively. The solutions were led to a coagulation bath containing pure water of 25° C., and wound up on a roller to produce an original yarn. The obtained original yarn was washed with water and then dried at 25° C. for 24 hours in a circulation dryer to produce a precursor of a hollow fiber porous carbon support.

Then, the precursor of the porous carbon support was passed through an electric furnace at 250° C. and heated in an air atmosphere for 1 hour to subject the precursor to an infusibilization treatment. Then, the obtained infusibilized yarn was carbonized at a temperature of 950° C. to produce a hollow fiber porous carbon support.

Both the outer surface and inner surface (surface of the hollow portion) of the produced porous carbon support were open, and when a cross section of the hollow fiber was observed, a co-continuous porous structure was seen.

Production Example 2 of Porous Carbon Support

A hollow fiber porous carbon support was produced in the same manner as in Production Example 1 of Porous Carbon Support except that the carbonization treatment was performed under the condition of a maximum temperature of 1,100° C. Both the outer surface and inner surface of the produced porous carbon support were open, and when a cross section was observed, a co-continuous porous structure was seen.

Production Example 3 of Porous Carbon Support

A hollow fiber porous carbon support was produced in the same manner as in Production Example 1 of Porous Carbon Support except that the carbonization treatment was performed under the condition of a maximum temperature of 800° C. Both the outer surface and inner surface of the produced porous carbon support were open, and when a cross section was observed, a co-continuous porous structure was seen.

Production Example 4 of Porous Carbon Support

A hollow fiber porous carbon support was produced in the same manner as in Production Example 1 of Porous Carbon Support except that the carbonization treatment was performed under the condition of a maximum temperature of 600° C. Both the outer surface and inner surface of the produced porous carbon support were open, and when a cross section was observed, a co-continuous porous structure was seen.

Production Example 5 of Porous Carbon Support

First, 12 parts by weight of an aromatic polyimide "Matrimid" (registered trademark) 5218 (a condensation product of 3,3',4,4'-benzophenone tetracarboxylic dianhydride and 5(6)-amino-1-(4'-aminophenyl)-1,3,3'-trimethylindane) as a precursor of a porous carbon support, 12 parts by weight of polyvinyl pyrrolidone (PVP) (Mw: 40,000) manufactured by Sigma-Aldrich Japan, and 76 parts by weight of 1-methyl-2-pyrrolidone (NMP) were mixed, and the mixture was stirred at 100° C. to produce a spinning stock solution.

The obtained spinning stock solution was cooled to 25° C., and then using a concentric triple spinneret, a 96 wt % aqueous solution of NMP, the spinning stock solution, and a 94 wt % aqueous solution of NMP were simultaneously discharged from the inner tube, the middle tube, and the outer tube, respectively. The solutions were led to a coagulation bath containing pure water of 25° C., and wound up on a roller to produce an original yarn. The obtained original yarn was washed with water and then dried at 25° C. for 24 hours in a circulation dryer to produce a precursor of a hollow fiber porous carbon support.

Then, the precursor fiber was carbonized at a temperature of 900° C. to produce a hollow fiber porous carbon support.

Both the outer surface and inner surface (surface of the hollow portion) of the produced porous carbon support were open, and when a cross section of the hollow fiber was observed, a co-continuous porous structure was seen.

An overview of the method for producing the porous carbon supports in the production examples are collectively shown in Table 1.

TABLE 1

| | Support precursor resin | Disappearing resin | Infusibilization °C. | Infusibilization min | Carbonization °C. | Fiber diameter μm | Co-continuous porous structure | Structural period μm |
|---|---|---|---|---|---|---|---|---|
| Production Example 1 | PAN | PVP | 250 | 60 | 950 | 320 | yes | 1.05 |
| Production Example 2 | PAN | PVP | 250 | 60 | 1100 | 310 | yes | 0.78 |
| Production Example 3 | PAN | PVP | 250 | 60 | 800 | 330 | yes | 1.28 |
| Production Example 4 | PAN | PVP | 250 | 60 | 600 | 330 | yes | 1.46 |
| Production Example 5 | Matrimid (registered trademark) 5218 | PVP | — | — | 900 | 280 | yes | 0.92 |

Example 1

The hollow fiber porous carbon support (length: 100 mm) produced in Production Example 1 was immersed in a polyacrylonitrile/DMSO solution (polymer: 10 wt %), and then withdrawn and immersed in water to remove the solvent. The hollow fiber porous carbon support was dried at 100° C. for 24 hours to produce a porous carbon support/carbonizable resin layer composite including the porous carbon support and a polyacrylonitrile resin layer provided on the porous carbon support.

Then, the porous carbon support/resin layer composite was passed through an electric furnace and heated in an air atmosphere at 250° C. for 1 hour to subject the composite to an infusibilization treatment. Then, the obtained infusibilized yarn was carbonized at a carbonization temperature of 600° C. to produce a hollow fiber carbon membrane for fluid separation.

Example 2

A hollow fiber carbon membrane for fluid separation was produced in the same manner as in Example 1 except that the hollow fiber porous carbon support produced in Production Example 2 was used.

Example 3

A hollow fiber carbon membrane for fluid separation was produced in the same manner as in Example 1 except that the hollow fiber porous carbon support produced in Production Example 1 was used, and that the maximum temperature of the carbonization treatment was 800° C.

Example 4

A hollow fiber carbon membrane for fluid separation was produced in the same manner as in Example 1 except that the hollow fiber porous carbon support produced in Production Example 5 was used, and that the maximum temperature of the carbonization treatment was 600° C.

Comparative Example 1

A hollow fiber carbon membrane for fluid separation was produced in the same manner as in Example 1 except that the hollow fiber porous carbon support produced in Production Example 3 was used.

A separation module was produced and subjected to decompression or carbon dioxide flow. As a result, part of the carbon membrane for fluid separation was broken. Therefore, the gas permeation measurement was not performed.

Comparative Example 2

A hollow fiber carbon membrane for fluid separation was produced in the same manner as in Example 1 except that the hollow fiber porous carbon support produced in Production Example 4 was used, and that the temperature of the carbonization treatment was 1,000° C.

A separation module was produced and subjected to decompression or carbon dioxide flow. As a result, part of the carbon membrane for fluid separation was broken. Therefore, the gas permeation measurement was not performed.

Comparative Example 3

Using the spinning stock solution prepared in Production Example 1, an 80 wt % aqueous solution of DMSO and a spinning solution were simultaneously discharged from the inner tube and the outer tube of a hollow fiber spinning nozzle having a double-tube structure, respectively. The solutions were led to a coagulation bath containing pure water of 25° C., and wound up on a roller to produce an original yarn. The obtained original yarn was washed with water and then dried at 25° C. for 24 hours in a circulation dryer to produce a precursor of a porous carbon support.

Then, the precursor of the porous carbon support was passed through an electric furnace at 250° C. and heated in an air atmosphere for 1 hour to subject the precursor to an infusibilization treatment. Then, the obtained infusibilized yarn was carbonized at a carbonization temperature of 950° C. to produce a hollow fiber carbon membrane for fluid separation.

The inner surface of the produced porous carbon support was open, but no pores were observed in the outer surface. When the cross section was observed, a co-continuous porous structure was seen.

A separation module was produced and subjected to decompression or carbon dioxide flow. As a result, part of the carbon membrane for fluid separation was broken. Therefore, the gas permeation measurement was not performed.

The structures and evaluation results of the carbon membranes for fluid separation produced in the examples and comparative examples are shown in Tables 2 and 3.

TABLE 2

| | | Methed for producing porous carbon support | | Method for producing dense carton layer | | Carbon membrane for fluid separation | | | | | | | | |
|---|---|---|---|---|---|---|---|---|---|---|---|---|---|---|
| | | | | | | | | | | | | XPS analysis | | |
| | | Carbonization | | | Carbonization | Film | Moisture absorption | Raman analysis | | | $C_s$ | $C_m$ | $N_m$ | | |
| | Production example | temperature ° C. | Precursor | temperature ° C. | thickness μm | rate % | $R_m$ | $R_s$ | $R_m/R_s$ | atomic % | atomic % | atomic % | $N_m/C_m$ | $C_m/C_s$ |
| Example 1 | Production Example 1 | 950 | PAN | 600 | 0.8 | 8.6 | 1.98 | 0.96 | 2.06 | 90.3 | 83.3 | 8.8 | 0.11 | 0.92 |
| Example 2 | Production Example 2 | 1100 | PAN | 600 | 1.5 | 7.8 | 1.97 | 0.92 | 2.14 | 92.5 | 84.6 | 6.2 | 0.07 | 0.91 |
| Example 3 | Production Example 1 | 950 | PAN | 800 | 1.0 | 8.5 | 1.27 | 0.96 | 1.32 | 90.5 | 86.7 | 6.5 | 0.07 | 0.96 |
| Example 4 | Production Example 5 | 900 | PAN | 600 | 1.2 | 3.2 | 1.97 | 0.87 | 2.26 | 91.2 | 82.9 | 8.9 | 0.11 | 0.91 |
| Comparative Example 1 | Production Example 3 | 800 | PAN | 600 | 1.2 | 12 | 1.98 | 1.27 | 1.56 | 87.3 | 82.5 | 7.5 | 0.09 | 0.95 |
| Comparative Example 2 | Production Example 4 | 600 | PAN | 1000 | 1.1 | 14 | 0.95 | 1.39 | 0.68 | 89.8 | 93.3 | 3.5 | 0.04 | 1.04 |
| Comparative Example 3 | — | 950 | — | — | 4.5 | 15 | 0.98 | 1.14 | 0.86 | 86.1 | 92.4 | 3.8 | 0.04 | 1.07 |

TABLE 3

| | Hygroscopic dimensional change rate | | | Number of broken fibers (out of 20 fibers) | | | Bend radius mm | $CO_2$ permeation rate $\times 10^{-9}$ mol/ ($m^2$ s Pa) | Separation factor $CO_2$/ $CH_4$ |
|---|---|---|---|---|---|---|---|---|---|
| | $\Delta L_1$ % | $\Delta L_2$ % | $\Delta L_3$ % | After decompression | After $CO_2$ flow | After water vapor-containing $CO_2$ flow | | | |
| Example 1 | 0.07 | 0.02 | -0.06 | 0 | 0 | 0 | 5.8 | 3.8 | 33 |
| Example 2 | 0.05 | 0.01 | -0.04 | 0 | 0 | 0 | 7.2 | 3.2 | 28 |
| Example 3 | 0.07 | 0.02 | -0.06 | 0 | 0 | 0 | 6.7 | 1.3 | 46 |
| Example 4 | 0.03 | 0.01 | -0.02 | 0 | 0 | 0 | 14.2 | 12.5 | 31 |
| Comparative Example 1 | 0.35 | 0.05 | -0.32 | 2 | 1 | 1 | 5.3 | — | — |
| Comparative Example 2 | 0.28 | 0.07 | -0.21 | 1 | 3 | 1 | 5.1 | — | — |
| Comparative Example 3 | 0.55 | 0.15 | -0.23 | 3 | 4 | 2 | 6.5 | — | — |

DESCRIPTION OF REFERENCE SIGNS

1: Porous carbon support
2: Dense carbon layer

The invention claimed is:

1. A carbon membrane for fluid separation comprising a porous carbon support and a dense carbon layer provided on the porous carbon support, wherein the porous carbon support has an $R_s$ value of 1.0 or less, where the $R_s$ value is an R value (peak intensity of D-band (1360 cm$^{-1}$)/peak intensity of G-band (1580 cm$^{-1}$)) calculated from a Raman spectrum.

2. The carbon membrane for fluid separation according to claim 1, wherein the $R_s$ value is 0.82 or more and 0.98 or less.

3. The carbon membrane for fluid separation according to claim 1, wherein the dense carbon layer has an $R_m$ value of 1.1 or more and 2.4 or less, where the $R_m$ value is an R value calculated from a Raman spectrum.

4. The carbon membrane for fluid separation according to claim 1, wherein a ratio between an $R_m$ value of the dense carbon layer and the $R_s$ value of the porous carbon support, that is, $R_m/R_s$, is 1.1 or more and 3.0 or less.

5. The carbon membrane for fluid separation according to claim 1, wherein a precursor of the porous carbon support is polyacrylonitrile or an aromatic polyimide.

6. The carbon membrane for fluid separation according to claim 1, wherein a carbon elemental composition $C_s$ at a surface of the porous carbon support measured by X-ray photoelectron spectroscopy is 85 atomic % or more and 95 atomic % or less.

7. The carbon membrane for fluid separation according to claim 1, wherein a ratio between a carbon elemental composition $C_s$ (atomic %) at a surface of the porous carbon support and a carbon elemental composition $C_m$ (atomic %) at a surface of the porous carbon support and a carbon elemental composition $C_m$ (atomic %) at a surface of the dense carbon layer, that is, $C_m/C_s$, is 0.85 or more and 0.95 or less, where the carbon elemental compositions $C_s$ and $C_m$ are measured by X-ray photoelectron spectroscopy.

8. The carbon membrane for fluid separation according to claim 1, having a hygroscopic dimensional change rate $\Delta L_1$ calculated by a formula shown below of 0% or more and 0.15% or less:

$$\Delta L_1 = \{(L_{100\%} - L_{1\%})/L_{1\%}\} \times 100$$

wherein $L_{1\%}$ is a dry length (mm) of the carbon membrane for fluid separation after being left to stand for 3 hours in a dry air (temperature: 20° C., relative humidity: 1.0%) environment; and
$L_{100\%}$ is a length (mm) of the carbon membrane for fluid separation after being left to stand for 3 hours in a saturated water vapor (temperature: 20° C., relative humidity: 100%) environment.

9. The carbon membrane for fluid separation according to claim 1, having a moisture absorption rate in a standard state of 0 wt % or more and 10 wt % or less.

10. The carbon membrane for fluid separation according to claim 1, wherein a nitrogen elemental composition $N_m$ at a surface of the dense carbon layer measured by X-ray photoelectron spectroscopy is 4 atomic % or more and 15 atomic % or less.

11. The carbon membrane for fluid separation according to claim 1, wherein the dense carbon layer has a nitrogen concentration ($N_m/C_m$: nitrogen elemental composition/carbon elemental composition) measured by X-ray photoelectron spectroscopy of 0.05 or more and 0.25 or less.

12. The carbon membrane for fluid separation according to claim 1, wherein a precursor of the dense carbon layer is polyacrylonitrile or an aromatic polyimide.

13. The carbon membrane for fluid separation according to claim 1, wherein the porous carbon support has a co-continuous porous structure.

14. The carbon membrane for fluid separation according to claim 13, wherein the co-continuous porous structure has a structural period of 0.002 μm or more and 10 μm or less.

* * * * *